US006972333B2

(12) United States Patent
Sung et al.

(10) Patent No.: US 6,972,333 B2
(45) Date of Patent: Dec. 6, 2005

(54) PREPARATION OF QUINACRIDONEQUINONES AND SUBSTITUTED DERIVATIVES OF SAME

(75) Inventors: Edward H. Sung, Cincinnati, OH (US); James Z. Dong, Mason, OH (US); George H. Robertson, Loveland, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 10/757,306

(22) Filed: Jan. 14, 2004

(65) Prior Publication Data

US 2005/0154207 A1    Jul. 14, 2005

(51) Int. Cl.$^7$ .................... C07D 471/02; C07D 471/04
(52) U.S. Cl. ........................................ 546/57; 546/49
(58) Field of Search ..................... 546/57, 49

(56) References Cited

U.S. PATENT DOCUMENTS

| 3,148,075 A | 9/1964 | Ehrich ................ 106/288 |
| 3,185,694 A | 5/1965 | Jaffe et al. ................ 260/279 |
| 3,251,845 A | 5/1966 | Jaffe ................ 260/279 |
| 3,632,588 A | 1/1972 | Ehrich ................ 260/279 |
| 4,025,518 A | 5/1977 | Wriede ................ 260/279 |
| 4,693,753 A | 9/1987 | Spietschka et al. ........ 106/495 |
| 4,956,464 A | 9/1990 | Bender et al. ................ 546/57 |

FOREIGN PATENT DOCUMENTS

| EP | 024892 | 8/1980 | ........... C09B 48/00 |
| EP | 0313965 | 5/1989 | ........... C09B 48/00 |
| GB | 1009792 | 11/1965 | |
| GB | 1020068 | 2/1966 | |
| GB | 1103750 | 2/1968 | ........... C09B 57/00 |
| GB | 124895 | 8/1971 | |
| JP | 11-246784 | * 9/1999 | ........... C09B 48/00 |
| JP | 11246784 | 9/1999 | ........... C09B 48/00 |

* cited by examiner

Primary Examiner—Charanjit S. Aulakh
(74) Attorney, Agent, or Firm—Sidney Persley

(57) ABSTRACT

A process for by oxidizing a quinacridone in a liquid medium with a non-metal oxidant producing a quinacridonequinone.

25 Claims, No Drawings

PREPARATION OF QUINACRIDONEQUINONES AND SUBSTITUTED DERIVATIVES OF SAME

BACKGROUND OF THE INVENTION

The invention relates to a process for the preparation of quinacridonequinones and substituted derivatives of same for use as pigments.

DESCRIPTION OF THE RELATED ART

Quinacridonequinone and its various substituted derivatives are well known compounds which are used as, or in the manufacture of, commercial pigments. In recent years, developments have led quinacridonequinones to be used as pigments of great importance with respect to their light and weathering fastness and color properties. For example, U.S. Pat. No. 4,693,753 discloses the formation quinacridonequinones and derivates of same for use as pigments.

Quinacridonequinones and substituted derivatives of same have been prepared by various prior art processes. As described in U.S. Pat. No. 3,185,694, a quinacridonequinone pigment is made by the condensation of anthranilic acid with benzoquinones in the presence of suitable oxidizing agents, followed by cyclization under the influence of dehydrating agents such as concentrated sulfuric acid. Quinacridonequinone pigments are also prepared by the oxidation of quinacridones with sodium dichromate or potassium permanganate as described in U.S. Pat. No. 3,632,588 or by the oxidation of corresponding dihydroquinacridones as described in U.S. Pat. No. 3,251,845 in which dihydroquinacridone is heated in a medium containing dichromate or permanganate. Although the quinacridonequinones produced according to U.S. Pat. No. 3,251,845 are highly satisfactory for many pigmentary applications, the purity and intensity of color for the quinacridonequinones are not as high as desirable, especially for high quality pigmentary applications. Furthermore, the oxidation reactions employed to synthesize the quinacridonequinones in these patents produce relatively large concentrations of heavy metal ions which must be removed from the reaction medium to avoid environmental pollution upon disposal of the reaction medium.

Other oxidation reactions using non-heavy metal have been reported. As described in U.S. Pat. No. 4,025,518, quinacridonequinones are prepared by oxidizing dihydroquinacridone in an aqueous acidic medium using an alkali metal chlorate as the oxidizing agent in the presence of vanadium pentoxide, and optionally passing air through the aqueous acidic medium during the oxidation. This process, however, is cumbersome, inefficient and expensive.

Thus, a need exists for a simpler, efficient, less expensive and/or more environmentally friendly process for producing high quality quinacridonequinones having increased purity and color strength.

SUMMARY OF THE INVENTION

It has now been found that the above objectives can be realized by employing a process for preparing quinacridonequinones of the formula:

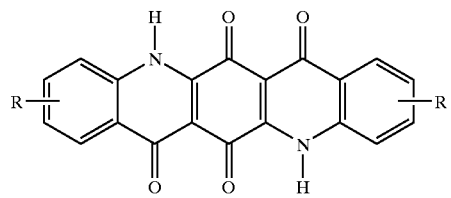

wherein each R substituent is independently selected from hydrogen, a halogen, a $C_1$–$C_{10}$-alkoxy, a $C_1$–$C_{10}$-alkyl or a substituted or unsubstituted phenyl; by oxidizing a quinacridone of the formula:

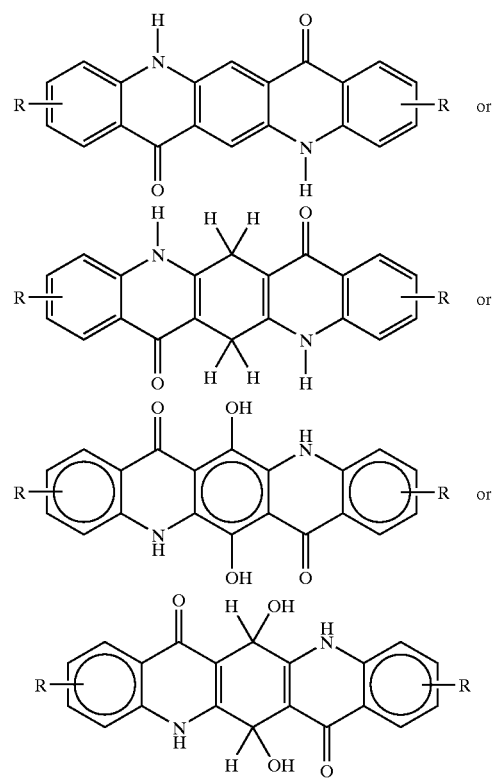

wherein each R substituent is independently selected from hydrogen, a halogen, a $C_1$–$C_{10}$-alkoxy, a $C_1$–$C_{10}$-alkyl or a substituted or unsubstituted phenyl in a liquid medium with a non-metal oxidant.

The present process further provides for increasing the purity of a quinacridonequinone.

Other objects and advantages of the present invention will become apparent from the following description and appended claims.

DETAILED DESCRIPTION OF THE INVENTION

Quinacridonequinones having increased purity are prepared by oxidizing quinacridones or substituted derivatives of same with a non-metal oxidant in a liquid medium, optionally, at elevated temperatures.

The quinacridones utilized in this invention are well known compounds and can be prepared by any number of methods known in the art. These conventional methods can be used to produce either the quinacridone or substituted derivatives of same, including but not limited to quinacridonea, dihydriquinacridonea, dihydroxyquinacridonea, and the like. Since a dihydroquinacridone may be considered to be a di-hydrogenated derivative of the corresponding quinacridone, hereafter the term "quinacridone" is to be understood to refer to either the quinacridone or its dihydroquinacridone derivative. The quinacridones preferably used in the present invention include Formulas I–IV below:

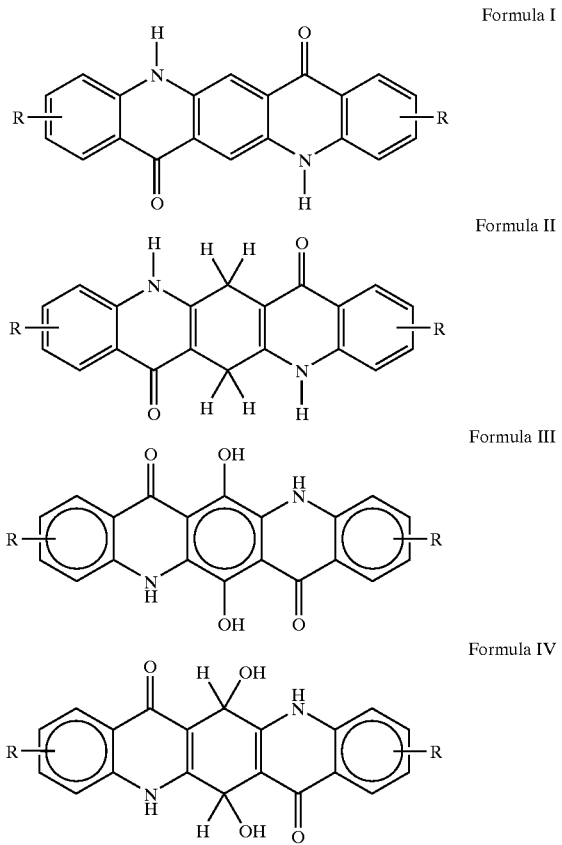

Formula I

Formula II

Formula III

Formula IV wherein the R substituent is as previously described above.

The liquid medium in which the oxidation is conducted may be water, organic solvents, inorganic solvents and combinations thereof. The organic solvents include, but are not limited to, dichlorobenzene, trichlorobenzene, and the like and combinations thereof. The inorganic solvents include, but are not limited to, sulfuric acid, polyphosphoric acid, phosphoric acid, acetic acid, and the like and combinations thereof. When an aqueous medium is utilized, the oxidation reaction can be performed in a neutral, acidic or alkaline condition. Further, a liquid medium suitable for use in the process of this invention may already be present during the synthesis process of the quinacridone starting material such as the synthesis of a quinacridone in water. The main criteria governing the selection of the liquid medium are that the quinacridone can easily be oxidized in the liquid medium and that the liquid medium does not interfere with the oxidation reaction.

Suitable non-metal oxidants for use in the invention include, but are not limited to, persulfuric acid and persulfuric acid salts, and the like, such as peroxydosulfuric acid and its salts, sodium peroxydisulfate ($Na_2SO_5$), and persulfuic acid derivatives. Preferably the non-metal oxidant is selected from sodium peroxydisulfate ($Na_2SO_5$), potassium peroxydisulfate ($K_2S_2O_8$), ammonium peroxydisulfate (($NH_4)_2S_2O_8$, and the like and combinations thereof. The most preferred non-metal oxidant is sodium peroxydisulfate as it is economical, safe and readily available.

The quinacridone is oxidized by combining it with a liquid medium and a non-metal oxidant. The non-metal oxidant should be added at least in partial excess with respect to the mole ratio of quinacridone to non-metal oxidant in order to produce the corresponding quinacridonequinone.

The non-metal oxidant can be added to the liquid reaction medium at many process points depending on the convenience of plant or process step arrangement. The non-metal oxidant can also be added sometime during the quinacridone synthesis process, for example, by adding a non-metal oxidant directly to an aqueous pigment slurry made from a pre-isolated quinacridone presscake.

The oxidation can be conducted at temperatures ranging from room temperature to about 85° C. The oxidation reaction, however, proceeds less favorably at temperatures below 40° C. and results in a poorer quality quinacridonequinone due to incomplete oxidation. While not wishing to be bound by theory, it is believed that the non-metal oxidants are reasonably stable when cool resulting in a slower decomposition to acid and oxygen. At temperatures higher than 85° C., oxygen gas evolves quickly from the non-metal oxidant and requires excess non-metal oxidant to achieve a complete reaction, which increases the cost of production. Thus, the preferred temperature for producing quinacridonequinone is between 55° C. and 65° C. The non-metal oxidant, when heated at a temperature of between 40° C. to 85° C., thus decompose rapidly in strongly acidic solutions, usually to hydrogen peroxide and sulfuric acid depending on the non-metal oxidant chosen.

A small amount of an iron containing compounds, such as FeSO can also be added to catalyze the reaction.

The quinacridonequinone once produced is finished and recovered in a conventional manner, e.g., filtration, washing and drying. It provides an attractive color, useful in metallic finishes with aluminum and can be used to form many solid solutions for coating and printing ink applications.

The process produces a quinacridonequinone of the formula:

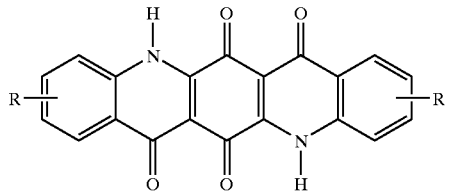

wherein each R substituent is independently selected from hydrogen, a halogen, a $C_1$–$C_{10}$-alkoxy, a $C_1$–$C_{10}$-alkyl or a substituted or unsubstituted phenyl. Groups exemplary of the above R substituent are, hydrogen; halogen such as chlorine, bromine; alkoxys such as methoxy, ethoxy, propoxy, isopropoxy, butoxy, isobutoxy, sec-butoxy, pentyloxy, isopentyloxy, neopentyloxy, hexyloxy, isohexyloxy, heptyloxy, octyloxy, 2-ethylhexyloxy, nonyloxy or decyloxy; alkyls such as methyl, ethyl, propyl, isopropyl, butyl, isobutyl, secbutyl, pentyl, isopentyl, neopentyl, hexyl, isohexyl, heptyl, octyl, 2-ethylhexyl, nonyl, decyl; phenyl; substituted phenyls such as such as 4-methylphenyl, 2,4- or 2,6-dimethylphenyl, 2-ethylphenyl, 4-ethylphenyl, 4-propylphenyl, 4-isopropylphenyl, 4-butylphenyl, 2-methoxyphenyl, 4-methoxyphenyl, 4-ethoxyphenyl, 4-propoxyphenyl, 4-butoxyphenyl, 2-chlorophenyl, 4-chlorophenyl, 2,4- or 2,6-dichlorophenyl, 4-bromophenyl or 2-methyl-4-chlorophenyl.

By carrying out the process of the present invention, a quinacridonequinone having a purity as high as 98% can be achieved as it is believed that this is when the oxidation process is nearly complete. The resulting purity is preferably between 90% to 98%.

The quinacridonequinone and its method of preparation under the present invention are further illustrated by the following non-limiting examples in which all parts and percentages are by weight, unless otherwise indicated.

EXAMPLE 1

Quinacridone (100 grams) was dissolved in concentrated sulfuric acid (500 grams), reacted and an iron salt (0.1 grams; $FeSO_4$) was added. The mixture was slowly heated to 50° C. Sodium peroxydisulfate (100 grams) was added over a 4 hour period, then the mixture was stirred for an additional 2 hours and added to water (2000 grams). After three hours of stirring, the slurry was filtered and washed with water to a pH 6.5–7.5 and dried. 109 grams of a bright yellow highly pure quinacridonequinone was produced.

EXAMPLE 2

Quinacridone (50 grams) was dispersed in water (1000 grams) and potassium hydroxide (50 grams) was added. The resulting slurry was then heated to 65° C. and sodium peroxydisulfate (200 grams) was added over a 6 hour period. The resulting slurry was stirred continuously for 8 hours at 65° C. then filtered. The resulting presscake was washed with water to neutral and dried. 55 grams of bright yellow highly pure quinacridonequinone was produced.

EXAMPLE 3

A quinacridone in water as the liquid medium was prepared by heating polyphosphoric acid (117%, 800 grams) to 115° C. and adding dianilinoterephthalic acid (200 grams) over a period of 3 hours while maintaining the temperature at about 115–120° C. The temperature of the mixture was further maintained at 115–120° C. for one hour then cooled down to 100° C. Water (15 grams) was slowly added over 10 minutes and the temperature was maintained at 100–105° C. for hours and then cooled to 80° C. To the aqueous quinacridone was added sodium peroxydisulfate (300 grams) over a 4 hour period. The mixture was stirred at 80° C. for 2 hours and then added to water (2000 grams). After 3 hours of stirring, the slurry was filtered and the resulting presscake was washed with water to a pH 6.5–7.5 and dried. 199 grams of a bright yellow highly pure quinacridonequinone was produced.

EXAMPLE 4

A quinacridone in water as the liquid medium was prepared by heating polyphosphoric acid (117%, 800 grams) to 115° C. and adding dianihino-dihydro-terephthahic acid (200 grams) over a period of 3 hours at about 115–120° C.

The temperature of the mixture was maintained for 1 hour, and later cooled down to 100° C. Water (15 grams) was added slowly and the additional temperature was maintained at 100–105° C. The aqueous quinacridone was added to water (1 liter) then sodium peroxydisulfate (350 grams) was added slowly over a 4 hour period at a temperature between 40–50° C. After 3 hours of stirring, the slurry was filtered and the resulting presscake washed with water to a pH 6.5–7.51 and dried. 198 grams of bright yellow highly pure quinacridonequinone was produced.

EXAMPLE 5

A quinacridone in water as the liquid medium was prepared by heating polyphosphoric acid (117%, 800 grams) to 115° C. and adding dianilinoterephthalic acid (200 grams) over a period of 3 hours at 115–120° C. The temperature of the mixture was maintained for 1 hour, and later cooled down to 100° C. Water (15 grams) was added slowly over 10 minutes and the temperature was maintained at 100–105° C. then further cooled to 80° C. To the aqueous quinacridone was added sodium peroxydisulfate (100 grams) over a 4 hour period. The mixture was then stirred at 80° C. for 2 hours then added to water (1 liter). After 3 hours of stirring, the resulting slurry was filtered. The resulting presscake was washed-with water to a pH 6.5–7.5 and dried. A solid solution of 189 grams containing bright yellow highly pure quinacridonequinone was produced.

The invention has been described in terms of preferred embodiments thereof, but is more broadly applicable as will be understood by those skilled in the art. The invention being thus described, it will be obvious that the same may be varied in many ways. Such variations are not to be regarded as a departure from the spirit and scope of the invention and are intended to be included within the scope of the claims.

We claim:

1. A process for preparing a quinacridonequinone of the formula

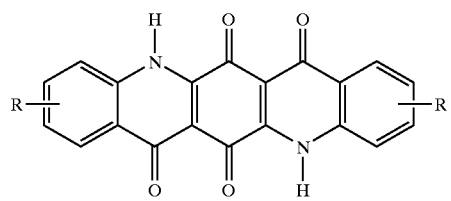

wherein each R substituent is independently selected from hydrogen, halogen, a $C_1$–$C_{10}$-alkoxy, a $C_1$–$C_{10}$-alkyl, a substituted phenyl, and unsubstituted phenyl; comprising oxidizing, in the presence of a liquid medium and an oxidant selected from the group consisting of persulfuric acid, persulfuric acid salts, persulfuric acid derivatives, and combinations thereof, a quinacridone of the formula

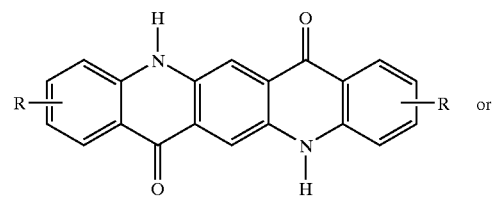

or

-continued

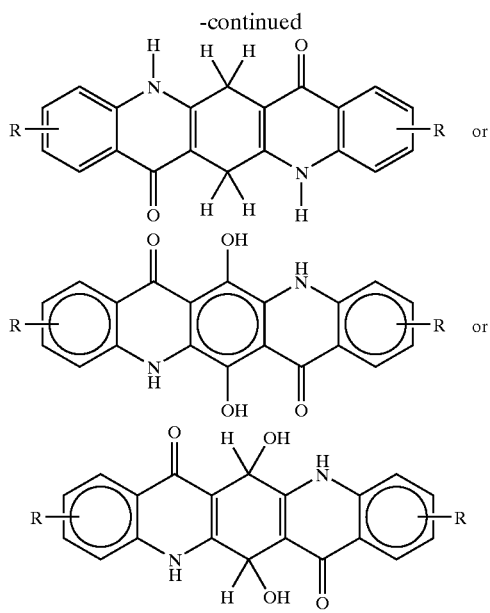

wherein each R substituent is independently selected from hydrogen, halogen, a $C_1$–$C_{10}$-alkoxy, a $C_1$–$C_{10}$-alkyl, a substituted phenyl and unsubstituted phenyl.

2. The process of claim 1, wherein each R substituent is a methyl group.

3. The process of claim 1, wherein each R substituent is a methoxy group.

4. The process of claim 1, wherein each R substituent is hydrogen.

5. The process of claim 1, wherein each R substituent is chlorine.

6. The process of claim 1, wherein said liquid medium is selected from the group consisting of water, organic solvents, inorganic solvents, and combinations thereof.

7. The process of claim 6, wherein said liquid medium is water.

8. The process of claim 6, wherein said liquid medium is sulfuric acid.

9. The process of claim 1, wherein said oxidant is selected from the group consisting of persulfuric acids, persulfuric acid salts, and combinations thereof.

10. The process of claim 9, wherein said oxidant is persulfuric acid.

11. The process of claim 9, wherein said oxidant is a persulfuric acid salt.

12. The process of claim 11 wherein said persulfuric acid salt is a peroxydisulfuric acid salt.

13. The process of claim 12, wherein said peroxydisulfuric acid salt is selected from the group consisting of sodium peroxydisulfate, potassium peroxydisulfate, ammonium peroxydisulfate, and combinations thereof.

14. The process of claim 13, wherein said peroxydisulfuric acid salt is sodium peroxydisulfate.

15. The process of claim 1 further comprising oxidizing the quinacridone at temperatures ranging from about room temperature to about 85° C.

16. The process of claim 15, wherein the temperature ranges from about 40° C. to about 85° C.

17. The process of claim 15, wherein the temperature ranges from about 55° C. to about 65° C.

18. The process of claim 15 wherein the quinacridone is of the formula

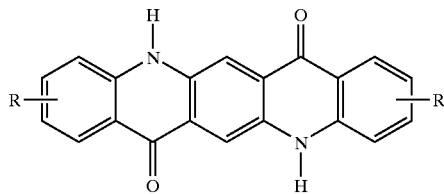

wherein each R substituent is independently selected from hydrogen, halogen, a $C_1$–$C_{10}$-alkoxy, a $C_1$–$C_{10}$-alkyl, a substituted phenyl and unsubstituted phenyl; the oxidant is sodium peroxydisulfate; and oxidizing temperature ranges from about 55° C. to about 65° C.

19. The process of claim 15 wherein the quinacridone is of the formula

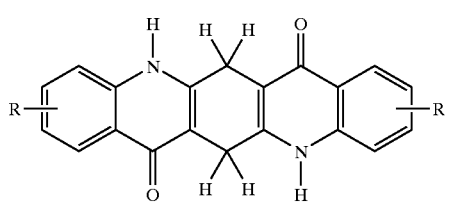

wherein each R substituent is independently selected from hydrogen, halogen, a $C_1$–$C_{10}$-alkoxy, a $C_1$–$C_{10}$-alkyl, a substituted phenyl and unsubstituted phenyl; the oxidant is sodium peroxydisulfate; and oxidizing temperature ranges from about 55° C. to about 65° C.

20. The process of claim 15 wherein the quinacridone is of the formula

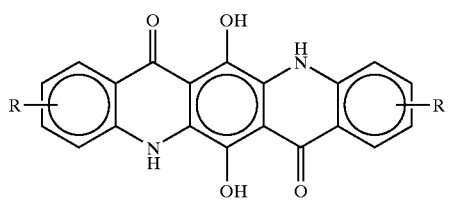

wherein each R substituent is independently selected from hydrogen, halogen, a $C_1$–$C_{10}$-alkoxy, a $C_1$–$C_{10}$-alkyl, a substituted phenyl and unsubstituted phenyl; the oxidant is sodium peroxydisulfate; and oxidizing temperature ranges from about 55° C. to about 65° C.

21. The process of claim 15 wherein the quinacridone is of the formula

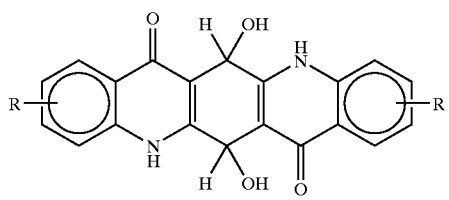

wherein each R substituent is independently selected from hydrogen, halogen, a $C_1$–$C_{10}$-alkoxy, a $C_1$–$C_{10}$-alkyl, a substituted phenyl and unsubstituted phenyl; the oxidant is sodium peroxydisulfate; and oxidizing temperature ranges from about 55° C. to about 65° C.

22. A quinacridonequinone prepared by the process of claim 1.

23. A quinacridonequinone prepared by the process of claim 15.

24. A process for improving purity of a quinacridonequinone of the formula

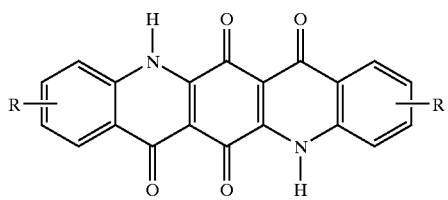

wherein each R substituent is independently selected from hydrogen, halogen, a $C_1$–$C_{10}$-alkoxy, a $C_1$–$C_{10}$-alkyl, a substituted phenyl, and unsubstituted phenyl; comprising oxidizing, in the presence of a liquid medium and an oxidant, selected from the group consisting of persulfuric acid, persulfuric acid salts, persulfuric acid derivatives, and combinations thereof, a quinacridone of the formula

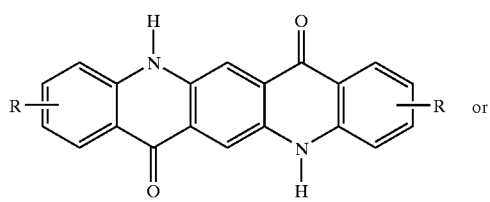 or

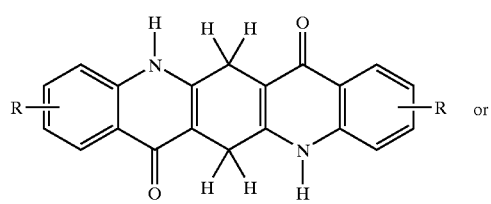 or

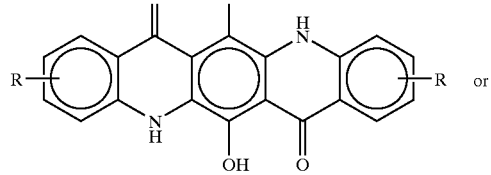 or

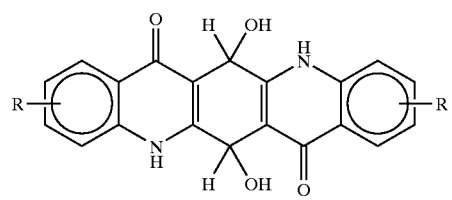

wherein each R substituent is independently selected from hydrogen, halogen, a $C_1$–$C_{10}$-alkoxy, a $C_1$–$C_{10}$-alkyl, a substituted phenyl and unsubstituted phenyl.

25. The process of claim 6, wherein the inorganic solvents are selected from the group consisting of polyphosphoric acid, phosphoric acid, acetic acid, and combinations thereof.

* * * * *